(12) United States Patent
Vyskocil et al.

(10) Patent No.: US 9,816,191 B2
(45) Date of Patent: Nov. 14, 2017

(54) METHOD FOR RECOVERY OF PHOSPHATE FROM A LIQUID PHASE

(71) Applicant: AVA-CO2 Schweiz AG, Zug (CH)

(72) Inventors: Jan Vyskocil, Zug (CH); Stepan Kusche, Karlsruhe (DE); François Badoux, Rotkreuz (CH)

(73) Assignee: AVA-CO2 Schweiz AG, Zug (CH)

( * ) Notice: Subject to any disclaimer, the term of this patent is extended or adjusted under 35 U.S.C. 154(b) by 294 days.

(21) Appl. No.: 14/686,924

(22) Filed: Apr. 15, 2015

(65) Prior Publication Data
US 2015/0299874 A1 Oct. 22, 2015

(30) Foreign Application Priority Data

Apr. 16, 2014 (DE) .................. 10 2014 105 471

(51) Int. Cl.
C02F 1/461 (2006.01)
C25B 1/18 (2006.01)
C02F 101/10 (2006.01)

(52) U.S. Cl.
CPC ............ C25B 1/18 (2013.01); C02F 1/46114 (2013.01); C02F 2001/46133 (2013.01); C02F 2101/105 (2013.01)

(58) Field of Classification Search
CPC ..... C02F 2001/46133; C02F 2101/105; C25B 1/18

See application file for complete search history.

(56) References Cited

U.S. PATENT DOCUMENTS

| | | | |
|---|---|---|---|
| 2006/0273047 A1* | 12/2006 | Newkirk ................. | A23J 1/14 210/780 |
| 2009/0159451 A1* | 6/2009 | Tomantschger ......... | C25D 1/00 205/96 |
| 2011/0135562 A1* | 6/2011 | Niksa ..................... | C01B 11/04 423/473 |
| 2013/0220919 A1 | 8/2013 | Bilbao et al. | |
| 2014/0021057 A1 | 1/2014 | Berrak | |
| 2015/0183641 A1* | 7/2015 | Heilmann ............... | C01B 25/22 71/37 |

FOREIGN PATENT DOCUMENTS

CN 101643928 A * 2/2010
WO 2012/059464 A1 5/2012

* cited by examiner

Primary Examiner — Arun S Phasge
Assistant Examiner — Salil Jain
(74) Attorney, Agent, or Firm — Collard & Roe, P.C.

(57) ABSTRACT

Known phosphorus recovery methods from liquid phases proceed from the presence of ammonia or nitrate, and phosphate, in the liquid phase. Wastewater that is supposed to be freed of nitrate and phosphate pollution in sewage treatment facilities can be used as the liquid phase. In electrochemical methods, a magnesium electrode is used as a sacrificial anode, and ammonium and phosphate together are bound to the magnesium to form struvite, which in turn can be used in agriculture as a fertilizer, in useful manner. In an alternative method of procedure, first, only phosphates are removed from a liquid phase that occurs from the filtration of products of hydrothermal carbonization. A magnesium electrode is used as the cathode, so that the resulting magnesium phosphate does not go into solution and first must be precipitated, but rather is removed from the electrolysis cell directly with the cathode, after the reaction occurs.

10 Claims, 2 Drawing Sheets

METHOD FOR RECOVERY OF PHOSPHATE FROM A LIQUID PHASE

CROSS REFERENCE TO RELATED APPLICATIONS

Applicant claims priority under 35 U.S.C. §119 of German Application No. 10 2014 105 471.7 filed Apr. 16, 2014, the disclosure of which is incorporated by reference.

BACKGROUND OF THE INVENTION

1. Field of the Invention

The present invention relates to a method for recovery of phosphate from a liquid phase, wherein a magnesium electrode and a further electrode are interconnected to form a first electrolysis cell, with the interposition of the liquid phase as an electrolyte solution.

2. Description of the Related Art

Such a method is already previously known from US 2014/0021057 A1. The object of this document is a method for the treatment of wastewater, within the scope of which phosphates are to be extracted from the wastewater in order to purify them for further use.

Due to fertilizer application using phosphates and nitrogen compounds, these substances get into wastewater, which is then drained into the sewer system along with rain. From there, they are conducted to sewage treatment plants, in which treatment of the water for further use is carried out. For this purpose, the aforementioned method provides for binding orthophosphates and ammonium, using an electrolysis cell, in an electrolytic method, in that magnesium is supplied by way of a sacrificial anode. In this connection, within the scope of the electrolysis method, magnesium ammonium phosphate, called struvite, which can be used as a fertilizer, is formed. It can be precipitated from the liquid phase and extracted from it.

Industrial wastewater, with the focus here being particularly on wastewater from hydrothermal carbonization, does not necessarily contain ammonium, so that an addition of ammonium would be necessary to carry out the method described above; this would be cost-intensive and ineffective. Therefore, as an alternative to the method mentioned above, a possibility is being sought for extracting only phosphates, for example orthophosphates, from a liquid phase, without the addition of cost-intensive and simultaneously environmentally harmful substances being required for this purpose. Furthermore, it represents an additional work step that the bound phosphate is once again filtered out of the electrolyte solution.

SUMMARY OF THE INVENTION

Against this background, the present invention is based on the task of proposing a simplified method for recovery of phosphate from a liquid phase, which makes do without the addition of ammonium.

This task is accomplished by means of a method for recovery of phosphate from a liquid phase in accordance with the invention. Further practical embodiments of such a method are discussed below.

According to the invention, it is provided that a magnesium electrode, as already provided in the state of the art, is also used. This magnesium electrode, however, is used not as a sacrificial anode, but instead as a cathode on which the phosphate contained in the liquid phase deposits when a voltage is applied. For this purpose, a different anode, preferably an inert anode, for example consisting of graphite, is required on the opposite side. This anode can advantageously contain inclusions, for example of alkali metals such as lithium or potassium, as a supplement.

The anode can be selected in such a manner that it functions as a sacrificial anode, in other words goes into solution within the scope of the electrolysis, while at the same time, the phosphate exiting from the liquid phase deposits on the magnesium cathode. This deposit results in magnesium phosphate, which in turn is already suitable as a fertilizer or can also be processed further. The advantage of this method of procedure is, in particular, that the magnesium cathode can easily be removed from the electrolyte solution, without a special filter process having to take place for this purpose. By means of subsequent crushing of the magnesium cathode, the magnesium phosphate can be obtained without problems. If an inert anode is used, an additional sacrificial anode can be used.

In this connection, the liquid phase that serves as the electrolyte solution is advantageously obtained in that the product of hydrothermal carbonization is mixed with an acid, this mixture is filtered, and the resulting liquid phase is removed. In this connection, the sequence provides that in particular, the slurry that results from the hydrothermal carbonization process is first passed to a press, so that the process water contained in the slurry can be coarsely removed, at first. The filter cake pre-dried by means of the pressing process is then mixed with an acid, for example with sulfuric acid, so that the phosphates from the filter cake dissolve in the sulfuric acid. In this connection, it is particularly advantageous if a pH in the range of 1 occurs during this mixing process, whereby the precise pH range should be from 0.5-1.5.

In such filtration, a very high proportion of the phosphates is already isolated; it can be assumed that about 90% of the phosphates can already be removed from the filter cake by means of such filtration. The proportion of phosphates removed can be increased once again by means of repeat filtration, with the renewed addition of a further solvent, for example of distilled water. For this purpose, the filter cake, which was once again separated from the sulfuric acid, is mixed with distilled water and in turn is once again filtered off in a filter basin, so that the liquid phase that occurs in this process once again washes out additional proportions of the phosphate.

The liquid phases formed in this way, on the basis of the distilled water or also of the sulfuric acid, either can be combined or can be used separately from one another as the liquid phase in the electrolysis cell.

Aside from the removal of phosphates, further removal of components can also be provided, in addition, which removal can take place by way of further electrolysis cells. Thus it is possible, for example, to remove material such as heavy metals, which pollute the liquid phase, by means of a suitable selection of electrodes. This removal can also particularly take place by means of further electrolysis cells, to which the liquid phase is applied one after the other; in this connection, however, the electrolysis cells can also be formed to overlap with one another, in that a cascade is built up, the individual cells of which are separated from one another by means of membranes, for example. The formation of individual pH regions within the electrolyte solution also leads to separation of these cells. Likewise, however, it is possible to bring the liquid phase from one electrolysis cell into the other, and to have it pass through multiple cells one after the other in this manner.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
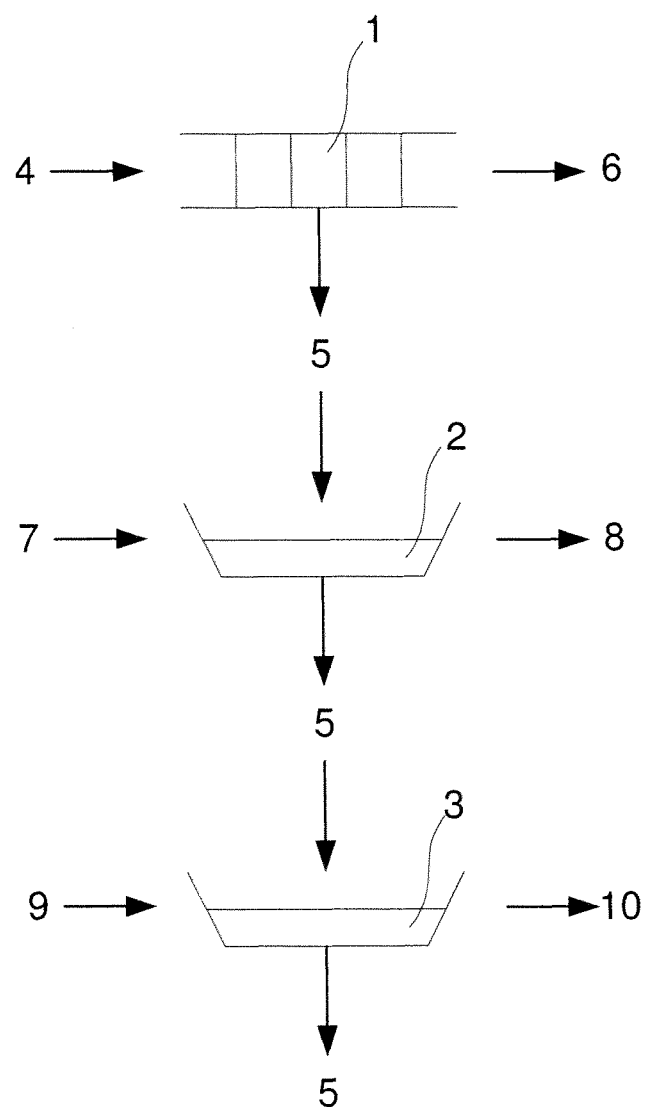
FIG. 1 is a schematic representation of a method section part for the production of the liquid phase, which forms the basis of the electrolysis.

FIG. 1 shows the production procedure of the liquid phase, wherein first, a chamber filter press 1 is used in order to free the slurry 4 passed to the press from the process water 6 contained in the slurry. By means of pressing the slurry 4, using the chamber filter press 1, the process water 6 is removed and passed back into the hydrothermal carbonization process. The filter cake 5, which has already been dried to a great extent, remains in the chamber filter press 1; in the next step, this cake is brought into a first filter basin 2, together with sulfuric acid 7.

As a result of thorough mixing at a pH in the range of 1, the sulfuric acid 7 dissolves out a large proportion of the phosphates contained in the filter cake 5, and can be removed from the first filter basin 2 by means of solid/liquid separation, as a first filtrate 8.

In a further step, which can ultimately be iterated, distilled water 9 is supplied to the filter cake 5 that has now been formed, and this mixture is once again thoroughly mixed in a second filter basin 3. This process dissolves further phosphates out of the filter cake 5, which is again filtered in the second filter basin 3, so that a second filtrate 10 can be removed, and the remaining filter cake 5, freed of phosphates to a great extent, can be processed further as a product.

Figure 2:
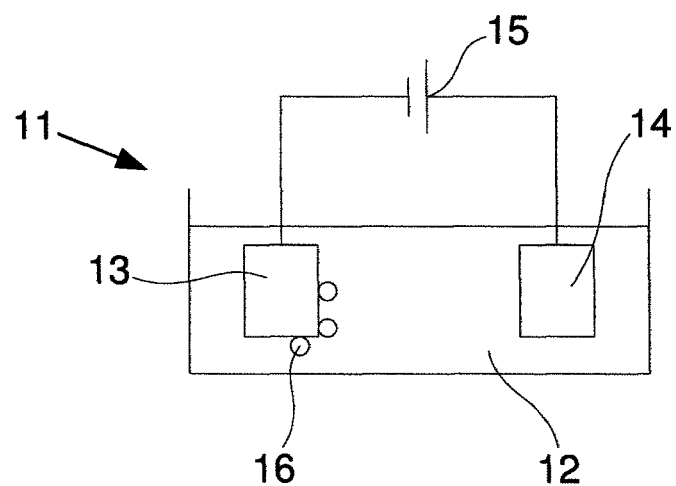
FIG. 2 is a schematic representation from the side of an electrolysis cell according to the present invention.

FIG. 2 finally shows an electrolysis cell 11, which has a cathode 13 and a sacrificial anode 14. In this connection, the cathode 13 is produced from magnesium. By application of a voltage between the two electrodes 13, 14, using a voltage source 15, the material of the sacrificial anode 14 goes into solution in the liquid phase 12, while the phosphates dissolved in the liquid phase 12 form a phosphate deposit 16 on the cathode 13. The phosphates dissolved in the liquid phase 12, which occurs as a result of the process described in FIG. 1, from thorough mixing of the filtrates 8 and 10, are thereby extracted from it, and can be recovered in this manner. The magnesium phosphate that occurs at the cathode 13 can be processed further or can be used directly in the form in which they are present, as magnesium phosphate, as a fertilizer, for example.

What has been described above is therefore a method for recovery of phosphates from a liquid phase, in which method it is provided to bring about deposition of the dissolved phosphates on the cathode, within the scope of electrolysis, so that the bound phosphates can be directly removed from the liquid phase. It is possible to do without the addition of further chemicals, in cost-saving and simultaneously environmentally friendly manner.

Although only a few embodiments of the present invention have been shown and described, it is to be understood that many changes and modifications may be made thereunto without departing from the spirit and scope of the invention.

What is claimed is:

1. A method for recovery of phosphate from a liquid phase comprising:
    (a) interconnecting a magnesium first electrode and a second electrode to form a first electrolysis cell, with the liquid phase interposed between the first electrode and the second electrode as an electrolyte solution; and
    (b) using the magnesium first electrode as a cathode in the first electrolysis cell, wherein the phosphate contained in the liquid phase deposits on the cathode during electrolysis;
    wherein a graphite electrode is used as an anode and the graphite electrode includes at least one alkali metal.

2. The method according to claim 1, wherein the liquid phase is produced in a first filtration step by mixing a product of a hydrothermal carbonization process with an acid so that a mixture is produced, first filtering the product from the mixture, and removing as the liquid phase a permeate from the first filtering.

3. The method according to claim 2, wherein the acid is sulfuric acid.

4. The method according to claim 2, wherein by mixing the acid in the mixture a pH in the range of 0.5-1.5 for the mixture is achieved.

5. The method according to claim 2, wherein filtration is repeated in at least one further filtration step, the at least one further filtration step comprising adding a further solvent to a retentate of the first filtering.

6. The method according to claim 5, wherein distilled water is used as the further solvent.

7. The method according to claim 5, wherein permeate from the at least one further filtration step is combined with the permeate from the first filtration step, to form the liquid phase.

8. The method according to claim 1, wherein after electrolysis, the liquid phase exits the first electrolysis cell and is used as an electrolyte solution in other electrolysis cells using other electrodes.

9. A method for recovery of phosphate from a liquid phase comprising:
    (a) interconnecting a magnesium first electrode and a second electrode to form a first electrolysis cell, with the liquid phase interposed between the first electrode and the second electrode as an electrolyte solution; and
    (b) using the magnesium first electrode as a cathode in the first electrolysis cell, wherein the phosphate contained in the liquid phase deposits on the cathode during electrolysis;
    wherein a third electrode is disposed in the first electrolysis cell as a sacrificial electrode.

10. The method according to claim 9, wherein an inert electrode is used as an anode.

* * * * *